Oct. 4, 1927.
A. McMURTRIE
1,644,299
CABLE CONNECTER
Filed March 3, 1924
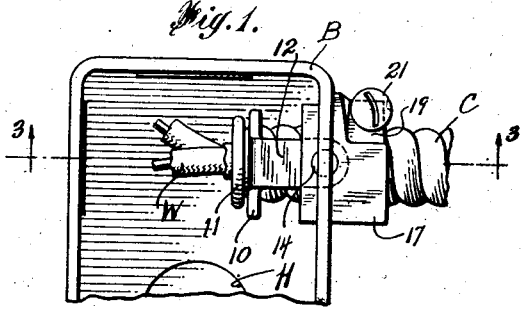
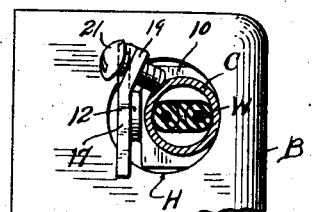
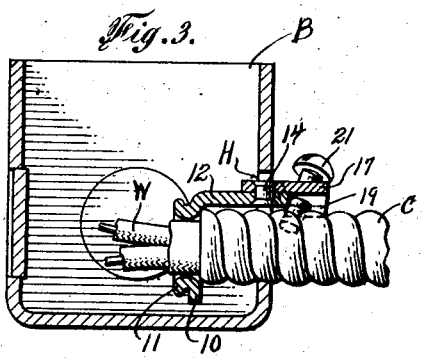
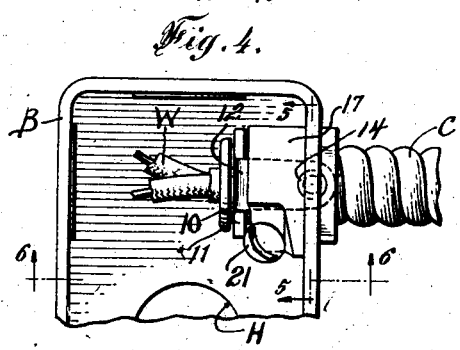
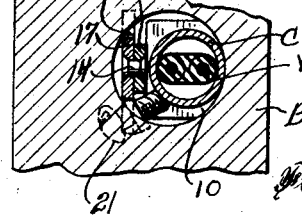
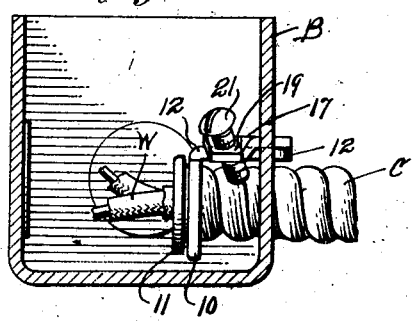
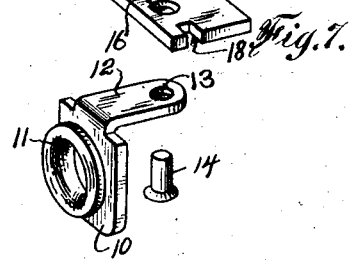
INVENTOR
Adnah McMurtrie
BY
ATTORNEYS Patented Oct. 4, 1927.

1,644,299

UNITED STATES PATENT OFFICE.

ADNAH McMURTRIE, OF NEW YORK, N. Y., ASSIGNOR TO THE THOMAS & BETTS CO., OF ELIZABETH, NEW JERSEY, A CORPORATION OF NEW JERSEY.

CABLE CONNECTER.

Application filed March 3, 1924. Serial No. 696,517.

This invention relates to combination cable connecters and outlet boxes, and especially to a new form of connecter for joining cable or conduit to boxes.

A primary object of the invention is to produce an improved cable connecter of increased utility and capable of being used in installing electric cable in old house work as well as new house work which is to say that a main object is to produce a universally adaptable cable connecter capable of interchangeability whereby the same connecter is quickly installed in a box with the cable clamping means disposed within the box as for old house work, or outside the box as for new house work.

Heretofore it has been necessary to make a cable connecter of one design for new house wiring work and still another for old house work but my invention affords one and the same connecter for both installations thereby simplifying the manufacturers' requirements as well as the users'. It is to be appreciated that, in new house work, the mechanic has access to the outlet and cable box fixtures before they are encased in the wall of the building as by plaster or otherwise and he may conveniently manipulate the fastening means outside the box in anchoring the cable to the box.

However, when it comes to old house work it is necessary to work inside the box because it is undesirable to disturb the wall or plaster around the box for once the wall or plaster is disturbed it becomes necessary to replace it with resulting unavoidable expense; and so it has been the practice to manufacture and stock a special cable connecter for this inside box work essential in rewiring or installing conduit in old houses where the wall is intact. The special old house cable connecter has its cable clamp means, usually a clamp screw, disposed inside the box, while a new house cable connecter has its screw means outside the box. Now with my new connecter the said cable clamping means is quickly interchangeable from one to the other without removing the screw.

An additional object of the invention is to produce the new type cable connecter possessing a simple structure and which is capable of being manufactured at low cost.

The accompanying drawings illustrate a preferred form of the invention the construction of which may be suitably varied or modified in certain respects without departing from the broad principles of the invention.

The first three figures of the drawing illustrate a new house work assembly with the cable clamp means placed outside the box; and the next three figures show an old house work installation with clamp means inside the box.

Figure 1 is a top or plan view of the connecter assembled with a box and cable; and Figure 2 is a side projection thereof showing the cable connecter in end elevation. Figure 3 is a sectional view taken on the line 3—3 of Figure 1.

Figure 4 is a plan view of the assembly; and Figure 5 is a detail as developed on the line 5—5 of Figure 4. Figure 6 is a detail assembly as taken on the line 6—6 of Figure 4.

Figure 7 shows a perspective disassembled view of the combination parts making up the universally adapted connecter useful alike in new and old house work.

Figure 8 shows an alternate form of the connecter in spaced perspective disassembled relation.

Referring to Figure 7 for an exemplary structure serving to illustrate the manner, the uses, and the objects of the invention, there is shown a two piece connecter each part of which may be stamped if desirable from sheet metal and assembled by suitable pivot retaining means such as a rivet; and it is to be understood that the two parts when assembled are rotatable freely one around the other about the axis of the assembling pivot means which is to say that one part rotates about the other part upon the rivet axis when considering the structure shown in the present drawings.

In one form of the invention, one of the stampings consists of a flat plate 10 which has a perforation punched therein and which may be swedged or drawn outwardly to provide a smooth round faced bushing 11 through which cable wires W pass and which are protected from damage in manipulating them to effect electrical connections. The plate 10 carries an integral ear, lug or reach bar 12 which is punched with a hole 13 near the outer end thereof; and a rivet 14 is passed through the said hole 13 for the purpose of inseparably joining the other connecter part thereto.

The other connecter part likewise constitutes a stamping in the nature of a lock or box hole edge anchorage plate 17 which, for the purpose of simplifying the illustration, is made substantially flat and is likewise provided with a punched opening 16 into which the said rivet 14 is introduced and riveted down as shown in the assembly views thus fastening the two stampings together to produce the simplified cable connecter having the wide range of uses hereinbefore mentioned. The box hole edge anchorage plate 17 is made with box wall embracing means such as anchorage notches 18 or they may be referred to as box hole edge notches because they embrace and overlap and lock into the peripherial edge defining the cable hole H in the box. The anchorage plate may, in one form of the invention, have one corner thereof pinched or turned downwardly at an angle to the plane face thereof such as is indicated by the numeral 19. This angular portion 19 is made with a threaded aperture 20 into which a clamp screw 21 is introduced for the purpose of bearing down on and gripping against the cable and serving to anchor the said connecter, the cable, and the box together by a single and simultaneous operation by the mechanic who is making the installation.

It is observed how the two connecter plates 10 and 17 are rotatably anchored together by a suitable screw or rivet means as shown at 14 and therefore the parts are relatively rotatable on the rivet axis which permits the cable clamping means, as the screw 21, to be swiveled about whereby the connecter is either made ready for new house work or old house work depending upon the particular job at hand. Furthermore the mean plane of the box hole edge notches 18 is preferably coincident with the axis of the rivet which permits the lock plate 17 to swivel one hundred and eighty degrees or be reversed end to end without altering the position of the notches.

When the mechanic is engaged on new house work it is unnecessary as well as undesirable to work on the inside of the box for effecting the anchorage of the connecter to the box itself for the reason that the wall around the box is not plastered up and he therefore has free access to the outside of the box with his tools such as a screw driver for driving and gripping the screw 21 down against the cable; and so the connecter is set to its greatest length by swiveling the two plates away from each other as shown in Figures 1, 2 and 3. The connecter and the cable C are then inserted in the box B with the clamp screw 21 on the outside of the box and with the box hole edge notches 18 embracing the periphery of the box hole or cable opening H whereupon the screw 21 is tightened down against the cable C which firmly seats the cable against the thin box hole edge H and simultaneously drives the connecter anchorage notches upwardly very tight in the box hole. The cable wires W pass through the bushing which is held rigidly as an abutment against which the cable end rests. The clamp screw 21 may be disposed at an angle which directs its line of force toward the opening H in the box; and furthermore the screw may be offset from the axis of the box hole H which grips the screw tangentially against the cable.

On the other hand, when the mechanic is engaged on old house work he is more limited as to available space for the reason that the box B is usually enclosed within the wall leaving no room to get tools alongside the outer wall of the box for the purpose of turning a clamp screw, and it therefore becomes necessary to anchor the connecter by operating the clamp screw on the inside of the box B. The mechanic, when provided with my improved connecter, swivels the plates around to their shorter length and more compact position such as shown in Figures 4, 5 and 6. The cable C is then placed in the hole H with the wires W passing through the bushing 11. The anchorage or box hole edge abutment notches 18 are then placed astride the box hole edge in the same manner as was hereinbefore described for new house work, and the screw 21 is driven down against the cable C which simultaneously jams the cable against the box wall opening H and causes the connecter to press upwardly away from the cable to simultaneously secure it in the box.

The cable connecter used under either or both conditions as hereinbefore described very positively fixes the cable to the box for the reason that the anchorage or abutment notches 18 press against the box hole and the thrust of the screw 21 ensures a positive seat in the box hole H for both the cable and the connecter. It is to be noted that the connecter reach bar extends alongside the cable C and being of ordinary flat construction does not surround the cable wall which permits the cable to be embraced circumferentially part way therearound by the edge of the box hole H thus bringing a considerable portion of the box hole H into engagement with the cable wall serving to distribute and equalize the considerable pressure with which the screw 21 causes the cable to bear against the box hole.

In one form of the invention, as in the present disclosure, the said clamp screw is preferably disposed in the lock plate at an angle and to slightly one side of the axis of the hole H thereby causing the said screw to grip tangentially against the wall of the cable thus avoiding damage to the cable and at the same time firmly seating the screw threads into the wall thereof to secure a positive gripping hold on the cable.

Advantages heretofore unknown in this art accrue in the use of this connecter for the reason that the contractor or the mechanic on the job is not compelled to carry in stock several different kinds of connecters. One connecter alone combines with and greatly facilitates the execution of all work.

It is apparent to any one versed in the art that the reach bar 12 may be placed above instead of beneath the plate 17 as shown in the drawings illustrating the preferred form of my invention and that the box wall embracing notches 18 may be carried by said reach bar instead of plate 17. And in this connection I have shown in Figure 8 this alternate structure wherein the reach bar 25 joins integrally with a box hole edge anchorage head 26 made with box hole notches 27 and an aperture 28 receives the rivet 29. The hole 28 may be disposed in alignment with the locking notches 27 though this is not essential in every respect. The inner end of the neck or reach bar 25 joins integrally with a cable stop plate 30 which may be provided with a drawn or swedged bushing through which the cable wires W pass.

A swivel screw carrying plate 32 is punched to receive the rivet or other fastening means 29 for assembling the two stampings and carries the tapped hole 33 for the clamp screw 34. The screw plate 32 is easily rotated or swiveled under the box hole anchorage head 26 for the purpose of swinging the clamp screw 34 around to either side of the anchorage head 26. For new house work the screw 34 stands outwardly at tne end of the member 26 but for old house work the screw 34 is disposed inside between the parts 26 and 30.

I have therefore produced a connecter having a single cable clamp means, as a single screw, which in effect performs three or more functions, namely, that of enabling the screw to be placed inside or outside the box, that of seating the anchorage abutments against a box hole edge, and that of simultaneously gripping the cable between the connecter and exposed edge of the box hole.

What I claim is:—

1. Cable and box connecting means comprising, a box having a cable and connecter receiving hole, a member of suitable size to fit into the box hole and formed to expose a portion of said box hole edge to a cable, box hole edge anchorage means included on the member into which seats the box hole edge to fix the member against displacement, and cable clamping means carried on the member including means by which said cable clamping means may be placed inside or outside the box to grip against the cable.

2. Cable and box connecting means comprising, a box having a cable and connecter receiving hole, a member of suitable size to fit into the box hole and formed to expose a portion of said box hole edge to a cable, box hole edge anchorage means included on the member into which seats the box hole edge to fix the member against displacement, a cable clamp screw and means cooperating with the member by which said screw is operatively placed inside or outside the box to grip against the cable.

3. Cable and box connecting means comprising, a box having a cable and connecter receiving hole, a flat plate of suitable size to fit into the box hole and formed to expose a portion of said box hole edge to a cable, box hole edge anchorage means included on the plate into which seats the box hole edge to fix the member against longitudinal displacement, a cable clamp screw, and means by which the screw cooperates with the plate and is operatively disposed inside or outside the box to grip against a cable.

4. Cable and box connecting means comprising, a box having a cable and connecter receiving hole, a member of suitable size to fit into the box hole and formed to expose a portion of said box hole edge to a cable, box hole edge anchorage notches included on the member into which seats the box hole edge to fix the member against longitudinal displacement, a screw threaded through the member and directed toward the cable, and a bushing including a reach bar pivotally attached to the member.

5. Cable and box connecting means comprising, a box having a cable and connecter receiving hole, a member of suitable size to fit into the box hole and formed to expose a portion of said box hole edge to a cable, box hole edge receiving notch means included on the member into which seats the box hole edge to anchor the member against longitudinal displacement, a screw threaded through the member adjacent the notch means, and a reach bar pivotally attached to the member and including means to bush the wires of a cable.

6. Cable and box connecting means comprising, a box having a cable and connecter receiving hole, a member of suitable size to fit into the box hole and formed to expose a portion of said box hole edge to a cable, box hole edge receiving notch means included on the member into which seats the box hole edge to anchor the member against longitudinal displacement, a screw threaded through the member adjacent the notch means, a reach bar, and pivot means movably connecting the reach bar to the member on an axis coincident with the plane of the box hole edge.

7. Cable and box connecting means comprising, a box having a cable and connecter receiving hole, a member placed in the box hole and another member pivotally connected thereto, one of the members including anchorage means to fix the connecter in the box hole, and a screw threaded through one of the members to grip against the cable.

8. A connecter comprising, a member of suitable size to fit into a box and including box hole edge anchorage means and being formed to leave exposed a portion of the box hole edge to a cable placed therein, screw carrying means on the member, a cable clamp screw threaded thereinto proximate the anchorage means, and said screw carrying means including means by which the screw may be placed on either side of the anchorage means.

9. A connecter comprising, a pair of members pivotally attached and including box hole edge anchorage means, a cable clamping device mounted in one pivotal member on one side of the pivot and anchorage means and including means by which the clamping device may be changed in position to the other side of the pivot and anchorage means thereby adapting said device to be placed inside or outside a box.

10. A connecter comprising, a pair of flat plates and pivot means joining them together, said plates being suitable in size to fit into a box hole and leave exposed a portion of said box hole edge to a cable received thereinto, anchorage means included on the connecter to fix it in a box hole, said anchorage means being placed in alignment with the pivot means, and a clamping device carried on one of the plates to grip against a cable.

11. A connecter as defined in claim 10 wherein the anchorage means comprises two opposed aligned notches formed in a plate and which positively seats against a box hole edge by the gripping action of the clamping device.

12. A connecter as defined in claim 10 wherein the clamping device is screw threaded through a plate adjacent the anchorage means.

13. A connecter as defined in claim 10 wherein the anchorage means comprises a pair of aligned notches diametrically opposite the pivot means.

14. A connecter comprising, a pair of members pivotally attached and including box hole edge anchorage means, a cable clamping device mounted in one pivotal member on one side of the pivot and anchorage means and said connecter including means by which the clamping device may be swung around to the other side of the pivot and anchorage means thereby adapting said cable clamping device to be placed inside or outside a box, and a bushing formed on one of the members which remains stationary as the other member and clamp device is pivotally adjusted relatively thereto.

In testimony whereof I affix my signature.

ADNAH McMURTRIE.